(No Model.)  T. H. FENNELL.  2 Sheets—Sheet 1.
SNOW PLOW.
No. 453,832.  Patented June 9, 1891.
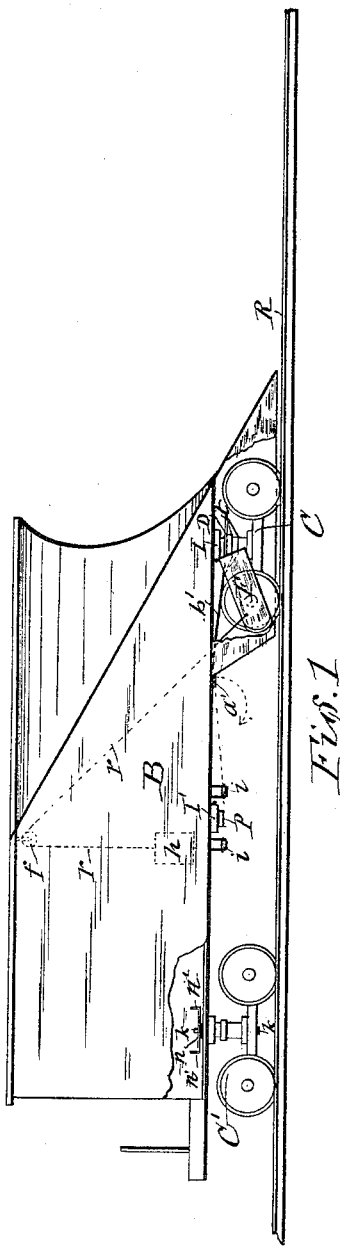
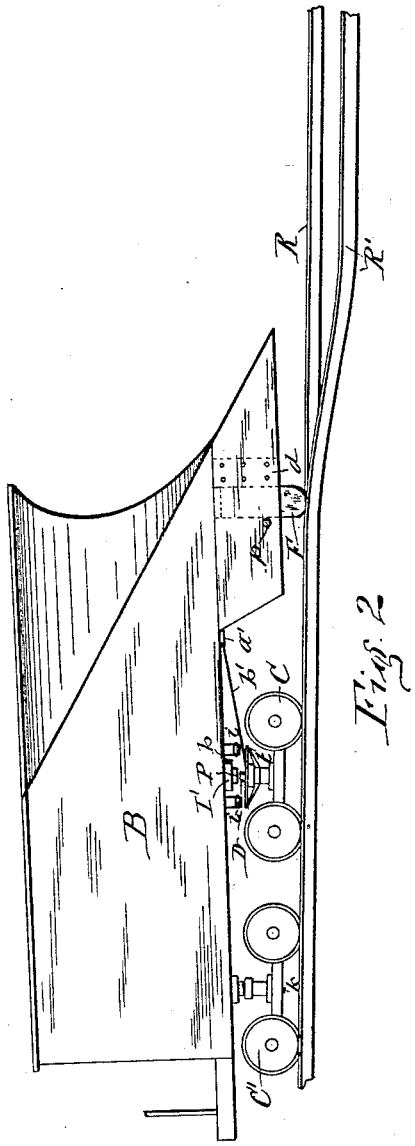
WITNESSES:  INVENTOR (No Model.)  2 Sheets—Sheet 2.

T. H. FENNELL.
SNOW PLOW.

No. 453,832.  Patented June 9, 1891.

WITNESSES:
J. J. Laass
C. L. Bendixon

INVENTOR:
Timothy H. Fennell
By Dodd, Laass & Dodd
his ATTORNEYS.

UNITED STATES PATENT OFFICE.

TIMOTHY H. FENNELL, OF SUMMIT STATION, NEW YORK.

SNOW-PLOW.

SPECIFICATION forming part of Letters Patent No. 453,832, dated June 9, 1891.

Application filed March 9, 1891. Serial No. 384,267. (No model.)

*To all whom it may concern:*

Be it known that I, TIMOTHY H. FENNELL, of Summit Station, in the county of Onondaga, in the State of New York, have invented new and useful Improvements in Snow-Plows, of which the following, taken in connection with the accompanying drawings, is a full, clear, and exact description.

This invention is designed, chiefly, for railway snow-plows mounted on trucks separate from the engines which propel them.

In the use of a snow-plow of the aforesaid class it frequently becomes necessary to turn it around on the road, and therefore the snow-plow has to be run to the nearest turn-table on the road. This in many cases necessitates the extra travel of many miles on the road to reach the turn-table, and at the season of the year when snow-plows are used the track is often so much obstructed by snow that the turn-table which may be nearest to the snow-plow, but at the rear thereof, is not accessible by the snow-plow.

The object of this invention is to obviate the aforesaid difficulties; and to that end the invention consists in novel, simple, and efficient means for rendering the snow-plow reversible on its own truck, as hereinafter more fully described, and set forth in the claims.

Figure 3:
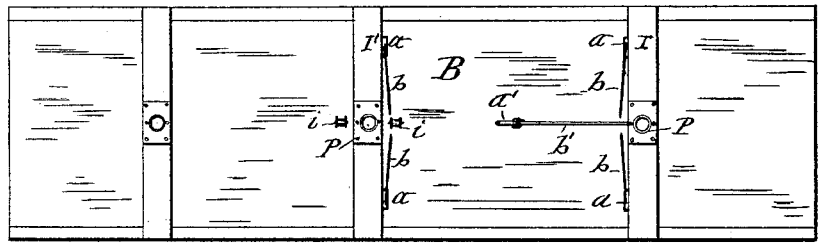
Figure 4:
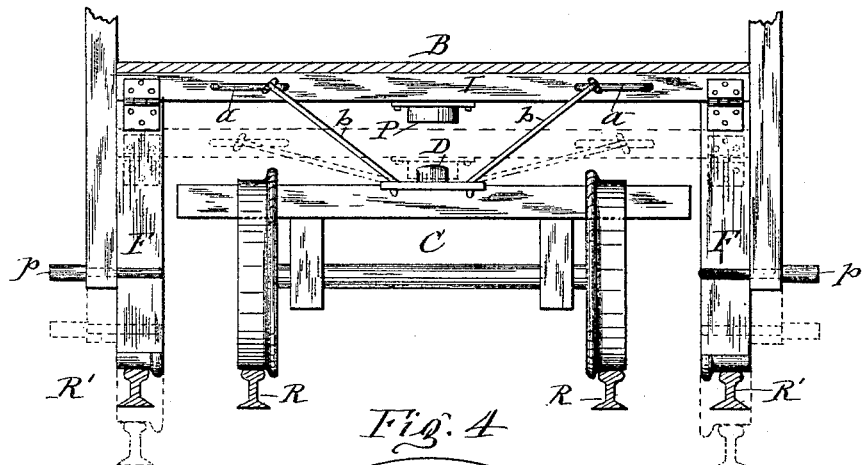
Figure 5:
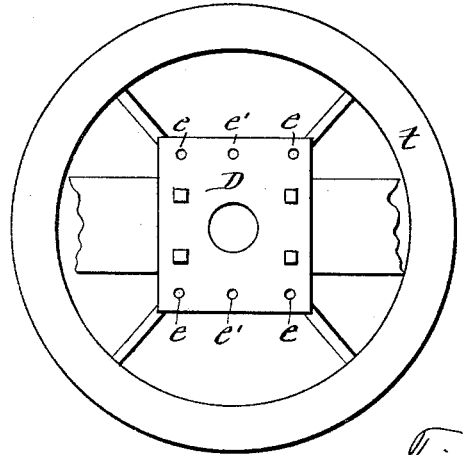

In the annexed drawings, Figure 1 is a side elevation of a snow-plow embodying my invention shown in its normal position. Fig. 2 is a side elevation showing the position of the snow-plow during the transfer of the removable truck. Fig. 3 is an inverted plan view of the snow-plow body. Fig. 4 is an enlarged front view of the connection of the removable truck with the snow-plow body and the props for raising said body off from the truck, and Fig. 5 is an enlarged top view of the central portion of the removable truck.

Similar letters of reference indicate corresponding parts.

B represents the frame or body of the snow-plow, which is mounted at opposite ends on trucks C C'. One of these trucks, preferably the forward truck C, is removable from the body B, while the other truck C' is secured to the said body by a king-bolt $k$ passing through said truck and bottom of the body B and provided on one end with a head and on the opposite end with a nut $n$, which is preferably provided with arms $n'$ $n'$, by which to turn it when required.

To the under side of the body B, between the trucks C C', I rigidly secure a pivotal bearing P, similar to that which rides on the truck C, so as to adapt it to receive said truck under it and become pivoted thereto.

For elevating the end of the snow-plow body sufficiently to allow the removable truck C to be transferred from the end bearing of the body B to the central bearing P, I employ props F F, which are hinged or otherwise adjustably connected to the end of the body B, which is supported by the removable truck, said props being adapted to be raised or swung into a position to clear the extra tracks R' R', which are directly under the props and are laid along the sides of the main track R R and inclined at their ends to a plane below the main track.

To raise the body B from the truck C, the snow-plow is to be drawn backward by an engine from the lower end of the tracks R' R' up to the portions which are on a level with the main track. In this movement the props F F are sustained in a vertical position by abutments $d$ $d$, rigidly secured to the sides of the snow-plow body B in front of the props, and removable pins $p$ $p$, passing through the sides of the body B at the rear of the props. Said props riding with their lower ends on the tracks R' R' causes them to raise the body B during the aforesaid movement of the snow-plow, as illustrated in Fig. 2 of the drawings, and when in this position the truck C can be pushed back to bring the bearing P central over the said truck. The pins $p$ $p$ being then removed and the snow-plow pushed ahead causes the props to be thrown into an inclined position, and thus lose their supports on the tracks R' R' and allow the snow-plow body to descend and become seated with its bearing P onto the corresponding central bearing-plate D, which is rigidly attached to the truck.

In order to guide the bearing P to the bearing D in the aforesaid movement I, employ suitable guide rods or braces *b b* and *b'*, which engage the truck C. I preferably hang the brace *b'* on a staple *a'*, secured to the under side of the body B, midway between the bearings P and P, and hang a pair of braces *b b* on elongated staples *a a*, attached to the side of each of the two bolsters I and I,' which are attached to the under side of the body B. Said braces are each formed with a downward-projecting free end, and the central bearing-plate D of the truck C is provided with two sets of perforations *e e' e*, respectively, in its front and rear portions, adapted to receive the free ends of the aforesaid braces. The braces *b b* on the bolster I enter the perforations *e e* in the rear portion of the plate D when the truck C is in its normal position under the front end of the snow-plow, and the braces *b b* on the central bolster I' enter the perforations *e e* in the front portion of the aforesaid plate when the truck C' is under the central part of the snow-plow. The brace *b'* can be swung forward or rearward to engage either of the perforations *e'* and *e'* in the rear and front portions of the plate D, according to the position of the truck.

When the truck C is under the central portion of the snow-plow and supports the same thereat, the snow-plow is very nearly or quite balanced and can then be turned around the truck C, so as to reverse the snow-plow end for end. After this is effected the snow-plow is to be again run upon the inclined track R' R', with the props F F riding thereon to raise the body B from the truck C. Then the central braces *b b* and the brace *b'* are to be detached from the truck and the latter to be shifted to its normal position under the end of the snow-plow. Then the braces *b b* on the forward bolster I are to be hooked into the perforations in the rear portion of the plate D and the brace *b'* to be swung forward and hooked into perforation *e'*, and then the body B is to be lowered onto the truck by moving the snow-plow to the inclined ends of the tracks R' R'. The props F F can then be raised to clear the track, and this I prefer to accomplish by means of ropes *r*, attached at one end to the props and passing with the opposite end up to and over pulleys *f*, connected to the top of the interior of the body B, the free ends of said ropes depending from the pulleys and having connected to them suitable weights *h* to counterbalance or partly counterbalance the props, and thus facilitate the adjustment of the props.

In order to properly support the body B in a horizontal position during the operation of reversing the same, as before described, I rigidly attach to the truck C a stout annular track *t* and secure to the under side of the body suitable bearings *i i*, by which the body B rides on the said annular track.

Having described my invention, what I claim as new, and desire to secure by Letters Patent, is—

1. A snow-plow mounted on trucks at opposite ends and having one of said trucks removable therefrom, and an extra pivotal bearing between the two trucks and adapted to receive under it the removable truck, as set forth.

2. The combination, with the snow-plow and truck removably connected thereto, of an extra pivotal bearing attached to the snow-plow body between the two trucks, adapted to receive the removable truck, and guides on said body engaging the removable truck and sustaining the same in its position for receiving the pivotal bearing of the snow-plow, as set forth.

3. The combination, with the snow-plow and truck removably connected thereto, of the pivotal bearing P, secured to the snow-plow body between the two trucks, the elongated staples *a a a'*, attached to the said body, and the guide-rods *b b b'*, connected longitudinally movably to the staples and detachably connected to the removable truck, as set forth.

4. The combination, with the snow-plow and the truck C, removably connected thereto, of the annular track *t*, attached to said truck, the pivotal bearing P, attached to the snow-plow body B between the trucks, and the bearings *i i*, secured to the body B equidistant from the bearing P, substantially as and for the purpose set forth.

5. The combination, with the snow-plow and removable truck C, of the central plate D, secured to the truck and provided with perforations in its front and rear portions, the pivotal bearing P, attached to the snow-plow body B between the trucks, and the guide-rods *b b b'*, connected to the body B and adapted to engage the perforations in either end of the plate D, substantially as and for the purpose set forth.

6. The combination, with the snow-plow and removable truck C, of the bearing-plate P, secured to the snow-plow body B between the trucks and adapted to receive under it the removable truck, and props connected to the body B at the end which is supported by the removable truck and adapted to support said end in an elevated position, as set forth.

7. The combination, with the snow-plow and removable truck C, of the bearing-plate P, attached to the snow-plow body B between the trucks, the props F F, connected adjustably to the end of the body B, which is supported by the removable truck, and tracks R' R' under the props and extending along the sides of the main track and inclined at the end to a plane below the main track, substantially as and for the purpose set forth.

8. The combination, with the snow-plow and removable truck C, the bearing-plate P, attached to the snow-plow body B between the two trucks, of the props F F, hinged to the end of the body B, which is supported by the removable truck, the abutments $d\ d$ and removable pins P P, receiving the props between them, and the tracks R' R' under the props and inclined at their ends, as set forth and shown.

In testimony whereof I have hereunto signed my name this 7th day of March, 1891.

TIMOTHY H. FENNELL. [L. S.]

Witnesses:
 MARK W. DEWEY,
 J. J. LAASS.